United States Patent [19]

Black et al.

[11] 4,450,077

[45] May 22, 1984

[54] GRANULAR MEDIA FILTER

[75] Inventors: Brent C. Black; Bruce D. Bradley; Ralph B. Haymore, all of Salt Lake City, Utah

[73] Assignee: Envirotech Corporation, Salt Lake City, Utah

[21] Appl. No.: 405,813

[22] Filed: Aug. 6, 1982

[51] Int. Cl.³ .............................. B01D 23/24
[52] U.S. Cl. .................... 210/275; 210/293
[58] Field of Search ................ 210/792–796, 210/264, 273, 275–279, 286, 293

[56] References Cited

U.S. PATENT DOCUMENTS

| | | | |
|---|---|---|---|
| 2,302,449 | 11/1942 | Laughlin | 210/275 |
| 2,302,450 | 11/1942 | Laughlin | 210/275 |
| 3,239,061 | 3/1966 | Horning et al. | 210/293 |
| 3,984,326 | 10/1976 | Bendel | 210/264 |
| 4,152,265 | 5/1979 | Meyers | 210/273 |
| 4,308,141 | 12/1981 | Clendenen | 210/276 |

Primary Examiner—Ivars C. Cintins
Attorney, Agent, or Firm—Robert E. Krebs

[57] ABSTRACT

An improved filtering machine of the down-flow type is disclosed wherein a particular section of a granular media filtration bed is isolated for backwashing while allowing filtration to proceed in the remainder of the bed. The filter machine includes a liquid-holding tank containing a bed of granular media, structure permitting passage of filtrate through the bed from below, a flume for distributing influent liquid containing suspended solids across the bed for downward percolation therethrough, and a partitioning chamber mounted on a carriage mechanism which selectively conveys the partitioning chamber across the surface of the bed. The partitioning chamber is reciprocatably insertable into the bed to isolate selected sections from the remainder of the bed. A pump is in communication with the partitioning chamber to draw liquid upward through the bed within the isolated section.

9 Claims, 3 Drawing Figures

GRANULAR MEDIA FILTER

The present invention relates to the separation of solids from liquids by filtration through granular media and, more particularly, to an improvement in granular media filters of the type wherein filtration is accomplished in a downward direction and backwashing of the granular media is accomplished in an upward direction.

Granular media filters are known for removing suspended solids from liquids. Such filters have long been utilized for potable water treatment but have only recently been introduced to waste-water treatment plants, where the suspended solids may comprise microbial flocs, coagulant residues, and a variety of other relatively unpredictable substances. Such filters normally include a tank for receiving flowing liquid containing suspended solids, a bed of granular media supported within the tank, means for removing liquid which has passed through the media (filtrate), and means for washing the granular media to remove particulates collected therein during filtration. Because the washing step is usually accomplished by passing liquid through the bed in a direction opposite to the flow direction for filtration, the washing step is usually referred to as backwashing.

In one well-known type of granular media filter, filtration is accomplished in the downward direction so that filtrate is reoved from beneath the media. Such "down-flow" filters may be of the type capable of semi-continuous operation, or of the type capable of continuous operation. In the latter type, partitioning walls are fixedly mounted to form a plurality of individual cells within the granular media bed so that backwashing can be accomplished in one of the cells while filtration proceeds in the other cells. Such filtering machines are shown in U.S. Pat. Nos. 3,239,061 and 4,152,265.

In "semi-continuous" granular media filters, the entire granular bed is used simultaneously for filtration until the bed collects solids to the extent that its resistance to flow adversely affects the rate of operation of the machine, or the effectiveness of removing solids. Then the machine is removed from filtration service and the entire bed is cleaned as a unit.

OBJECTS, ADVANTAGES AND SUMMARY

A primary object of the present invention is to provide an improved filtering machine of the down-flow granular media type wherein a particular volume or section of the filtration bed can be isolated for backwashing while allowing filtration to proceed in the remainder of the bed. More particularly, an object of the present invention is to provide novel and economical ways and means to isolate selected portions from the remainder of the granular bed, without providing fixed partitioning walls, and to backwash the isolated sector while filtration proceeds in the remainder of the bed.

To the above-stated ends, the present invention provides a down-flow granular media filter wherein the granular bed is continuous—which is to say, is not sectionalized by fixed partition members—and wherein a selectively-positionable patitioning mechanism is provided for insertion into the bed to isolate a selected section from the remainder of the bed so that backwashing can be accomplished in the isolated section while filtration proceeds in the remainder of the bed.

Further objects and advantages of the present invention can be readily ascertained from the following description and appended drawings, which are offered by way of example and not in limitation of the present invention, the scope of which is defined by the appended claims and equivalents.

IN THE DRAWINGS

DETAILED DESCRIPTION OF THE PREFERRED EMBODIMENT

Figure 1:
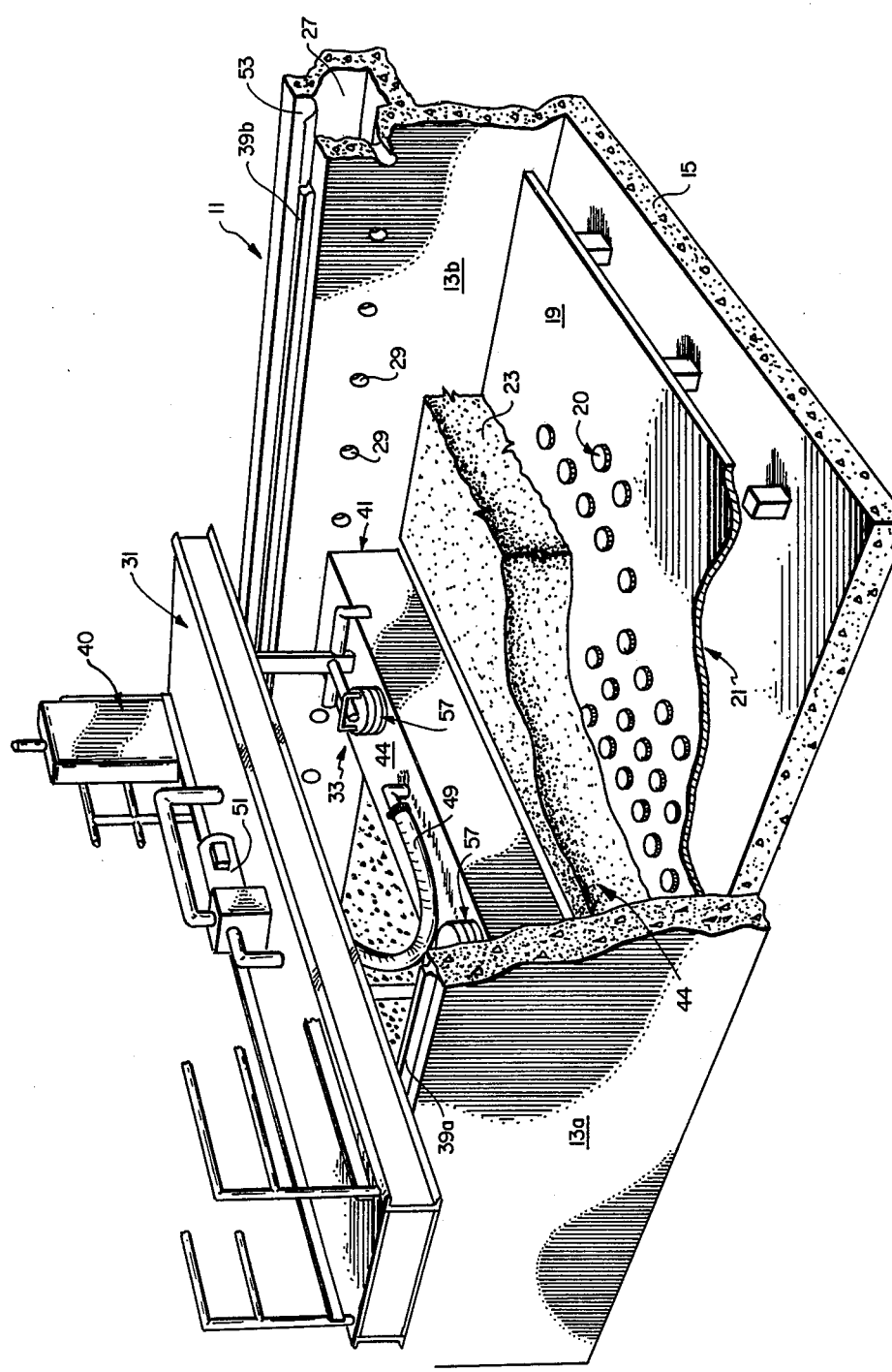
FIG. 1 is a pictorial view of a filtering machine according to the present invention, portions of which are cutaway for purposes of illustration.

The filtering machine of FIG. 1 includes an open rectangular basin or tank 11 having upstanding sidewalls 13a and 13b, a bottom wall 15 and endwalls (not shown). A generally horizontal member 19, herein referred to as an underdrain support means, is mounted within the tank 11 adjacent the bottom wall 15. The purpose of the underdrain support means 19 is threefold. First, as its name implies, it supports an overlying filtration bed 23 composed of granular media. Second, the illustrated underdrain support means includes conventional underdrain nozzles 20 whicih cooperatively assist in backwashing the bed to remove collected particulates. Third, the underdrain support means includes drainage ports, herein nozzles 20, through which filtrate passes after having percolated through the granular bed. The filtrate receiving chamber 21 below the underdrain support means is basically an open cavity extending beneath the entire extent of the bed. That is, the filter receiving chamber need not contain any complex system of pipes or headers to accommodate backwashing. Ultimately, filtrate is collected in clearwells, not shown, located at an end of the filtrate receiving chamber 21, or, alternatively, along a side of the chamber 21.

The granular media which comprises the filtration bed 23 can be composed of various materials. For example, the granular media can be gravel, sand, anthracite, activated carbon, or various resins of pre-selected grain size. It can be composed either of a single material or of two or more different materials laid in strata. Also, intermixed granular medias are known. In any such embodiment, the bed 23 is continuous and fills a substantial portion of the tank 11 above the support means 19 and has a generally horizontal upper surface. The purpose of the bed is to remove suspended solids from influent liquid which percolates through the bed; to this end, the bed performs the functions of straining, intercepting, and absorbing suspended solids.

The machine of FIG. 1 further includes means for distributing influent liquid containing suspended solids across the surface of the granular bed. The illustrated influent distribution means includes an open trough or flume 27 supported along sidewall 13b of the tank 11, and ports 29 formed through the side wall of the flume at spaced-apart intervals. The ports 29 are in liquid-flow communication with the flume 27 so that influent liquid passes from the flume through the ports 29 to distribution across the surface of the filtration bed 23 in a uniform, relatively non-turbulent flow pattern. These same functions can be achieved by other influent distribution means such as, for example, a system of manifolds and pipes.

Referring still to FIG. 1, the filtering machine of the present invention includes a selectively-movable carriage mechanism which supports and conveys a partitioning means 33 across the upper surface of the bed 23 along the length of the tank 11. The illustrated carriage mechanism comprises a bridge 31 which traverses the tank 11 and is supported and guided on the sidewalls 13a and 13b by parallel rail members 39a and 39b which extend lengthwise of the respective sidewalls. An indexing means moves the bridge 31 to selected spaced-apart locations along the rails. Preferably the indexing means comprises an electric gearmotor operatively coupled to drive wheels (not shown) mounted to the bridge, and limit switches to disengage power to the drive wheels when the bridge 31 reaches the preselected location on the rails. It should be understood, however, that the above-described bridge 31 and indexing means are only examples of various means which can be utilized to convey the partitioning means 33 to predetermined locations above the surface of the filtration bed 23. For example, the partitioning means 33 can be supported directly from the rails.

Figure 2:
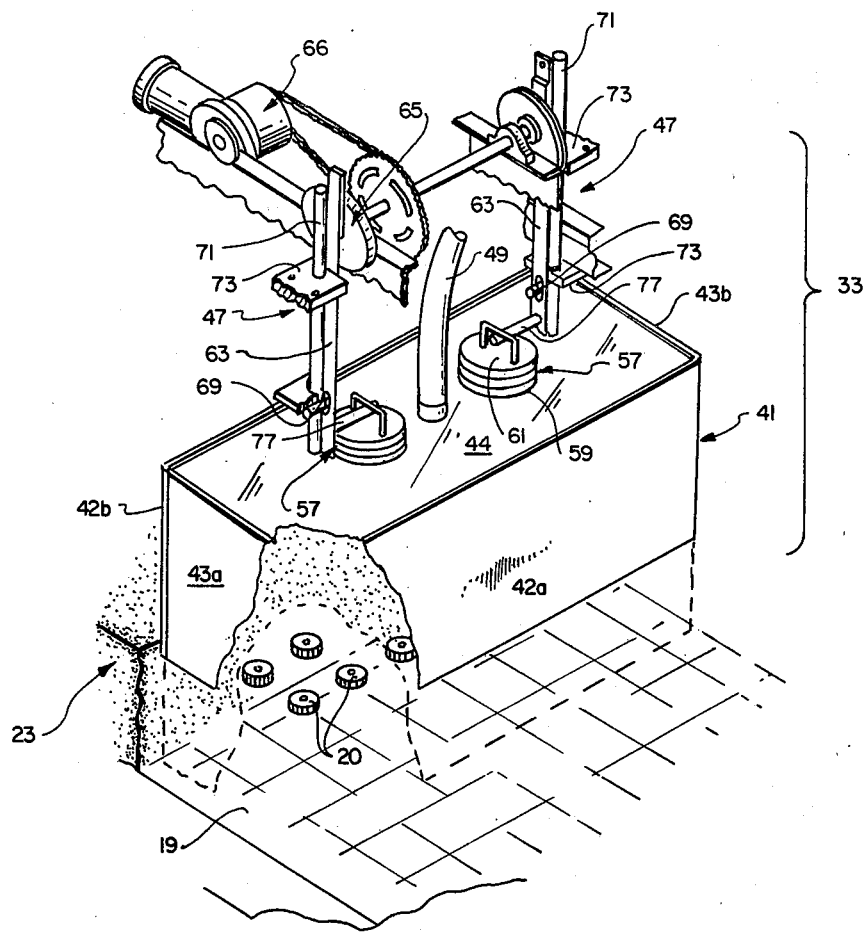
FIG. 2 is a pictorial detail of the machine of FIG. 1 particularly illustrating a partitioning mechanism.

The partitioning means 33 shown in FIGS. 1 and 2 includes an elongated box-like chamber 41 having vertically extending sidewalls 42a and 42b, endwalls 43a and 43b, a topwall 44, and an open bottom. The partitioning chamber 41 spans the width of the filter bed. The width of chamber 41 defines the width of the section of the filtration bed which is to be isolated for backwashing and, accordingly, is matter of design choice. Normally, the isolated section would be between about 1.3 to about 2.6 feet in width. For reasons which will become obvious hereinafter, the vertical extent of the sidewalls and endwalls should slightly exceed the depth of the bed 23, say by about eight to twelve inches in order to, inter alia, accommodate expansion of the granular bed.

As best shown in FIG. 2, the partitioning chamber 41 is mounted to the bridge 31 by a pair of reciprocatable mechanisms, generally indicated by numeral 47, for selective up-and-down movement. (In the following, only one of the reciprocatable mechanisms 47 will be described in detail; the other mechanism of the pair is functionally identical.) In its uppermost position, the reciprocatable mechanisms 47 raise the chamber 41 sufficiently that the lower edges of the sidewalls and endwalls are spaced above the surface of the bed 23. In the lowermost position, the sidewalls and endwalls extend into the bed so that their edges rest against the underdrain support 19. In essence then, the partitioning chamber is dimensioned so that, in its downward-most position, it is submerged below the surface of the freeboard liquid and encloses or isolates a portion of the granular bed while leaving the afore-memtioned clearance between the surface of the bed and the top of the chamber.

The normal liquid level within the tank 11 during filtration is usually about 26 to about 42 inches above the underdrain support means 19. For the illustrated embodiment of the partitioning chamber 41, the liquid depth extends above the topwall 44, when the chamber is fully inserted into the granular bed.

As shown both in FIGS. 1 and 2, a backwash withdrawal means is mounted in communication with the interior of the partitioning chamber 41. The illustrated backwash withdrawal means comprises a flexible conduit 49 connected at its one end in liquid-flow communication with the interior of the partitioning chamber and at its other end with a pump 51 mounted to travel with the bridge 31. A manifold, not shown, can be mounted in communication with the conduit 49 internal of the chamber 41 to uniformly draw backwash liquid across the horizontal extent of the chamber. In the illustrated embodiment, the pump 51 discharges spent backwash-liquid into an open trough 53 mounted within or next to the influent launder 27 and extending the length thereof.

At this juncture, it should be appreciated that the partitioning chamber 41 can have various, functionally-equivalent, structural embodiments. For example, the endwalls 43a and 43b of the chamber can be eliminated if the ends of the chamber (which would then be open) are in a generally sealing relationship with the interior sidewalls 13a and 13b of the tank 11. As another example, the top wall of the chamber 41 can be eliminated and the sidewalls extended upward to prevent freeboard liquid from flowing downward into the chamber when the same is fully inserted into the bed 23. In the lexicon of the present invention, these various embodiments are all to be understood to be encompassed by the term "partitioning chamber."

Further, it should be understood that auxiliary backwash withdrawal means can be employed. Thus, in addition to the above-described withdrawal means, a pump means can be connected to force liquid into the partitioning chamber during backwashing to assist in effectuating the backwash. That is, the liquid conveyed by the auxiliary pump would assist in dislodging and discharging particulates from the granular bed during backwashing.

Also mounted in communication with the interior of the illustrated partitioning chamber 41 are selectively operable release-valve means, illustrated in FIGS. 1 and 2 as valves 57. Each of the illustrated valves includes an annular seat 59 which is mounted to the top wall 44 of the partitioning chamber in registry with an aperture formed through the topwall, and a circular valve plate 61 mounted for selective closure against the seat. In the illustrated embodiment, the closure plates 61 are connected to the reciprocatable mechanisms 47a and 47b which, in turn, provide selective opening and closing of the respective valves.

Figure 3:
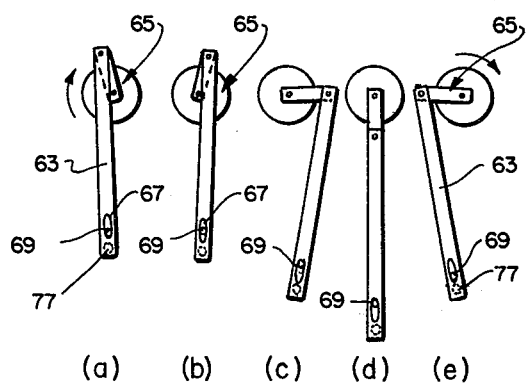
FIGS. 3(a) through (e) are details of a linkage system incorporated in the mechanism of FIG. 2.

As shown in FIGS. 2 and 3, each one of the pair of reciprocatable mechanisms includes a crank mechanism 65 mounted to the bridge 31 and an elongated linkage member 63 which is pivotably connected at its lower end to the topwall 44 of the partitioning chamber and at its upper end to the crank mechanism 65. In the illustrated embodiment, each linkage member 63 has a vertically-elongated slot 67 formed near its lower end; horizontal pin members 69 (herein referred to as lift pins) are freely received in slots 67 with the other end of the pins being fixed to vertically-disposed guide shafts 71. Each guide shaft is rigidly fixed at its lower end to the partitioning chamber 41, thereby establishing pivotal connections between the linkage member and the partitioning chamber. At its upper end, the guide shafts 71 are slidably received in a registered pair of guiding means 73, one pair being on each side of the bridge 31. Thus, the guide shafts 71 and guiding means 73 function to restrain the partitioning chamber from movement in other than the vertical direction. At the lower end of the linkage members 63, second pin member 77 is rigidly affixed to the linkage member to enable opening and closing of the circular valve plates 61.

In operation, the reciprocatable mechanisms 47a and 47b jointly serve to raise and lower the partitioning chamber 41 and to selectively open the valves 57. The operation of the reciprocatable mechanism can be best understood with reference to FIG. 3, where it can be seen that the vertical position of valve closure plate is controlled by the linkage member in the sense that, when the reciprocatable mechanism 47a begins its upward travel, the valve closure plate 61 begins to lift from its seat 59, except for any slack introduced by attachment between the pin 77 and the closure plate 61. Initiation of upward travel of the partitioning chamber 41 is controlled by the dimension of the slot 67 in the linkage arm 63; as a result, the partitioning chamber will not begin to be lifted until the pin member 69 reaches the bottom of the slot 67. Thus, FIG. 3(a) shows the linkage member in its fully raised position, at which times the valves 57 are open; FIG. 3(b) shows the linkage member just after it has begun downward travel—the partitioning chamber and linkage falling freely as indicated by the lift pin 69 being located about midway within the slot 67; FIG. 3(c) shows the half-lowered position, at which time the valves 57 are completely closed; FIG. 3(d) shows the fully lowered position, when the partitioning chamber 41 is resting on the support means 19; and FIG. 3(e) shows the partly-raised position, with the pin member 77 raising the circular valve plate 61 to open the valves 57.

Usage and operation of the afore-described filtering machine can be readily understood by first considering the condition where the reciprocatable mechanism has raised the paritioning chamber 41 fully from the granular bed. At that time, the total extent of the granular bed is utilized for filtration; which is to say, influent liquid containing suspended solids is distributed from the flume 27 across the entire surface of the granular bed and the liquid percolates downward so that suspended solids are caught in the interstices in the bed. This filtration operation will continue for a preselected period of time or until some controlling event occurs, such as the measured hydraulic head loss across the filter reaching a predetermined value due to flow resistance arising from captured solids lodged in the interstices of the bed 23, whereupon the bridge 31 will automatically advance to travel on the rails 39a and 39b. (As the bridge travels, the lower edges of the partitioning chamber 41, depending upon the vertical position selected, can be made to skim floating debris on the liquid surface or to level the surface of the granular bed.) Once a preselected position has been reached above the bed, the reciprocatable mechanisms 47a and 47b will be actuated to cause the partitioning chamber 41 to travel downward until it rests against the underdrain support member 19. In the preferred embodiment, the weight of the partitioning chamber 41 is sufficient to enable it to sink into the bed when the reciprocatable mechanisms are actuated. Downward travel of the partition chamber is facilitated by initiating operation of the backwash pump 51 as the partitioning chamber begins its descent so as to destabilize the granular media below the partitioning chamber, thereby easing penetration of the sidewalls and endwalls 42a and 42b, 43a and 43b into the bed. Alternatively, means may be provided to positively force downward motion of the partitioning chamber into the bed.

Once the partitioning chamber 41 has come to rest against the underdrain support 19, the backwash pump 51 is fully operational to draw liquid into the backwash discharge conduit 49. This pumping action causes filtrate to flow from the filtrate-receiving chamber 21 upwardly through the underdrain nozzles 20 into the isolated sector of the granular bed. The pumping action should be sufficiently vigorous to expand, or fluidize, the granular bed so that collected particulates and other solids are sheared from the granules and entrained in the flow of backwashing liquid and, therewith, carried to discharge into the trough 53. It should be emphasized that while the selected sector of the bed is being backwashed, filtration is taking place in the remainder of the bed. After a pre-selected period of time, the backwash pump 51 is shut off and the partitioning chamber is raised. The release valves 57 will begin to open just as the partitioning chamber 41 begins to rise, thereby allowing liquid to flow into the upper region of the partitioning chamber, thereby preventing granular bed material from being drawn upward with the retracting partitioning chamber. Upward travel of the partitioning chamber continues until its sidewalls are above the bed surface, at which time filtration proceeds normally in the previously isolated sector of the bed. The afore-described cycle then resumes, with the bridge progressively traveling across the surface of the filter bed 23 until all sections of the bed are sequentially backwashed.

With the above-described invention in mind, various auxiliary features will readily be suggested. For example, gas introduction means can be mounted in communication with the lower extend of the granular bed 23 to selectively agitate selected sectors of the bed with gas prior to backwashing those sectors. As another alternative, the backwash withdrawal means could operate to remove some granular media during backwashing and then return that media to the bed prior to retraction of the partitioning chamber from the bed.

Likewise, various alternative structural arrangements can be provided within the scope of the above-described invention. For example, the filter tank can be circular and the partitioning mechanism can be mounted to pivot about the center of the tank; in this embodiment, the partitioning mechanism would, preferably have a wedge-like shape and would be supported at the tank periphery by a circular rail. In this embodiment, the carriage mechanism is indexed circumferentially across the surface of the bed in the circular tank, cleaning successive sectors.

We claim:
1. A filtering machine comprising:
(a) an open, liquid-holding tank;
(b) a bed of granular filter media which is contained in said tank;
(c) means mounted with said tank for supporting the bed of granular filter media while permitting passage of filtrate through the bed from below;
(d) means for distributing influent liquid containing suspended solids across the upper surface of the bed for percolation downward therethrough;
(e) a partitioning means mounted on said tank and a carriage mechanism to selectively convey said partitioning means across the upper surface of the bed, said partitioning means including a partitioning chamber selectively insertable into the bed to isolate one section from the remainder of the bed; and
(f) means to selectively allow insertion of said partitioning chamber into the bed and removal of said partitioning chamber from the bed;

(g) pump means in communication with the interior of said partitioning chamber to draw liquid through the bed within the isolated section to backwash the isolated section while filtration proceeds in the remainder of the bed.

2. A filtering machine according to claim 1 wherein said means for selectively allowing insertion and removal of said partitioning chamber includes a linkage system to positively lift said chamber from the bed and, then during insertion, to let said chamber descend by gravity into said bed.

3. A filtering machine according to claim 1 further including valve means selectively openable to permit liquid to flow into the upper region of said partitioning chamber as the same is raised from the filter bed.

4. A filtering machine according to claim 1 including a filtrate-receiving chamber disposed below said means supporting the bed of granular media.

5. A filtering machine according to claim 4 wherein said tank is rectangular in horizontal cross-section and wherein filtrate is discharged from said filtrate-receiving chamber at an end of said tank.

6. A filtering machine according to claim 1 wherein said means for distributing influent includes a flume supported along a sidewall of the tank and ports in liquid-flow communication with the flume to distribute liquid across the granular filter bed.

7. A filtering machine according to claim 1 wherein said tank is rectangular in horizontal cross-section and said carriage mechanism includes a bridge which is mounted to traverse the tank and rail means to support and guide said bridge from movement along the length of said tank.

8. A filtering machine according to claim 7 wherein said partitioning chamber spans the width of said granular bed and is rectangular in cross-section with an open bottom.

9. A filtering machine according to claim 7 wherein said pump means comprises a selectively-operable pump which is mounted on said bridge and which is connected flexibly in communication with the upper interior region of said partitioning chamber.

* * * * *